July 23, 1957   J. J. SCULLY   2,799,950
PORTABLE RADAR TRAINING UNITS
Filed April 9, 1954
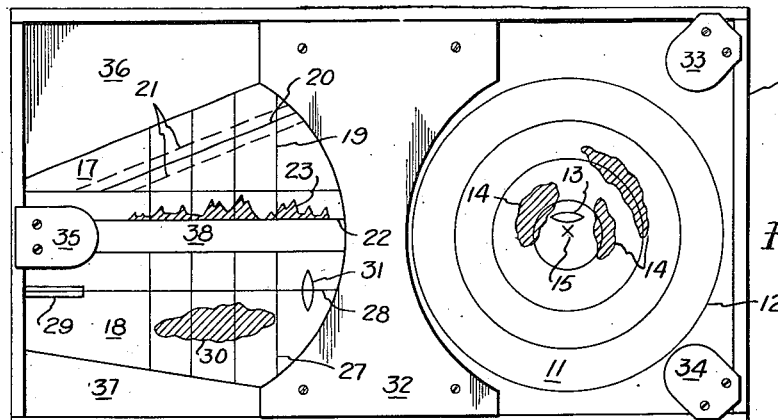
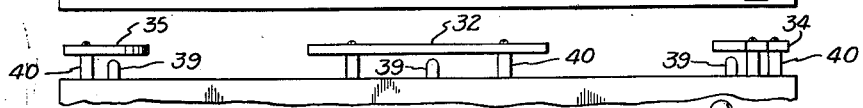
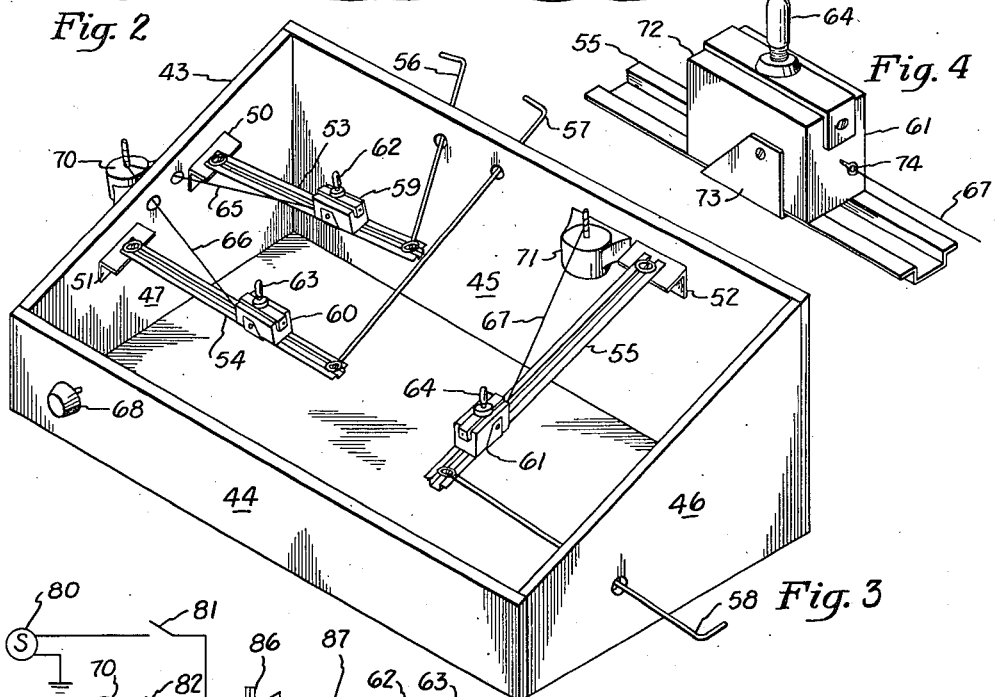
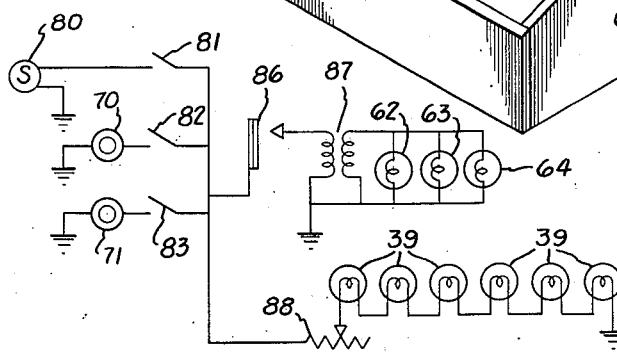
INVENTOR.
John J. Scully
BY
Howard L. Rose
AGENT _United States Patent Office_

2,799,950
Patented July 23, 1957

2,799,950

PORTABLE RADAR TRAINING UNITS

John J. Scully, Bayside, N. Y.

Application April 9, 1954, Serial No. 422,283

2 Claims. (Cl. 35—10.4)

(Granted under Title 35, U. S. Code (1952), sec. 266)

The invention described herein may be manufactured and used by or for the Government of the United States for governmental purposes without the payment to me of any royalty thereon, in accordance with the provisions of 35 United States Code (1952), section 266.

This invention relates generally to a radar training unit and more specifically to a device for training student controllers to give proper instructions to aircraft in response to radar indications.

The interpretation of the showing of radar indicators in the control towers of airports and the giving of correct orders to aircraft in accordance with the radar information requires considerable skill on the part of the controller. Since controlling aircraft at landing fields does not permit errors to be made, this skill is difficult for student controllers to obtain.

It is, therefore, desirable to have a simple training device to allow student airport controllers to practice controlling aircraft under the guidance of an expert and without reliance on actual radar apparatus or aircraft.

It is an object of this invention to provide a simple, compact, lightweight radar trainer.

It is another object of this invention to provide a radar trainer which will simulate one or more radar scopes and allow the instructor to adjust the target course.

It is a further object of this invention to provide an easily portable radar trainer requiring no auxiliary equipment for its operation.

Other objects and advantages will occur to those skilled in the art from the consideration of the following specification taken in connection with the accompanying drawing in which Figure 1 is a top plan view of a radar trainer embodying the principles of this invention.

Figure 2 is a partial back elevation view looking parallel to the top surface of the device shown in Figure 1.

Figure 3 is a perspective view of the radar trainer shown in Figure 1 with the top removed.

Figure 4 is a detail showing of one of the target lamp carriages shown in Figure 3.

Figure 5 is a schematic diagram showing the electrical connections of the lamps, motors and other electrical components used in the device shown in Figures 1 through 4.

As shown in Figure 1, the top 10 of the radar trainer carries a simulation of two oscilloscopes. The airport surveillance scope 11 and the elevation portion 17 and the azimuth portion 18 of the precision approach radar scope. The simulated radar oscilloscope screens 11 and 17—18 are made of a translucent material. A translucent green plastic is preferred because it approximates the appearance of a radar scope.

The plastic member bearing the simulation of the airport surveillance radar scope 11 is shown in Figure 1 as extending from the front to the back of the top 10 of the trainer unit. It is also shown in Figure 1 as extending from the right side of the top 10 to a point at least under the light shield 32 extending from front to back along the middle of the top 10.

Various indicia representing the various markings which might appear on the screen of the corresponding radar scope are placed on the plastic plate to create the simulation 11 of the airport surveillance radar scope. These are preferably engraved in the plastic plate and includes the concentric circles 12, which represent the range marker circles appearing on a radar scope. The shaded portions 14 represent echoes from fixed objects which would normally appear on a radar scope. The lenticular mark 13 represents a radio fan marker which would probably be engraved in the plastic plate. The X-mark 15 denotes the position of the airport. In the example shown in Figure 1, the airport surveillance radar scope has a range of about 20 miles. The range marker circles 12 are about five miles apart on the scope.

The simulation of the precision approach radar scope is also preferably indicated by a piece of translucent green plastic bounded at the top and bottom respectively by the pieces of plywood 36—37 and on the right by the lamp shield 32. This piece of plastic bears a simulation 17 of the elevation portion of the approach radar scope and bears the simulation 18 of the azimuth portion of the precision approach radar scope. The strip of plastic 38 between the simulations 17—18 is painted black to represent the unscanned portion of the radar scope.

The elevation simulation 17 bears a number of permanent indicia, preferably engraved in the plastic, such as the range marker lines 19. Line 20 is the ideal glide path for an aircraft approaching the runway. Lines 21 on either side of line 20 are at a predetermined distance from line 20 and are for the purpose of enabling the student to estimate the aircraft's distance above or below the perfect glide path. Lines 20—21 would preferably be engraved in the plastic. Line 22 represents the surface of the ground. Shaded areas 23 represent echoes given by permanent land marks such as buildings.

The azimuth portion 18 of the precision approach radar scope also bears certain permanent indicia, preferably engraved, such as the range marker 27, which correspond to the range marker lines 19 of the elevation portion. The rectangle 29 represents the landing strip at the airport, while line 28 is an extended centerline of the landing strip 29. Lenticular mark 31 represents a radio fan marker which will come to the attention of the pilot as he passes over it. Indicia 28, 29 and 31 would preferably be engraved in the plastic. Shaded area 30 represents echoes given by permanent land marks, such as buildings.

As best seen in Figure 2, light shields 32, 33, 34 and 35 are raised a slight distance above the top 10 of the radar trainer unit. Light bulbs 39 are placed under the light shields 32—35 to illuminate the indicia borne by the radar scope simulations 11 and 17—18. Light shields 32—35 are carried by supports 40.

The top 10 of the radar training unit is carried by a frame 43 shown in Figure 3. The top 10 is normally hinged by hinges not shown, to the front 44 of the frame 43 so that the interior of the unit can be readily inspected and accessible for repairs. However, for purposes of clearly showing the internal mechanism of the radar training unit, the top 10 is omitted from Figure 3.

The frame 43 of the radar trainer unit consists of a front 44, sides 46 and 47, and a back 45, which is of greater depth than the front 44, so that the top 10 is tilted toward the operator for better visibility. Brackets 50—51 are attached to the left sidewall 47 at a point slightly below the top thereof, and are positioned to be approximately under the precision airport radar scope simulation 17—18, respectively. Bracket 52 is fixed to the back wall 45 at a point slightly below the top thereof, and is positioned to be approximately in line with the center of the simulation of the airport surveillance radar scope 11.

Pivoted to the brackets 50—51—52 are one-end track members 53—54—55, respectively. Pivotally connected to the other ends of the track members 53—54—55 are control rods 56, 57, 58 respectively. Mounted on track members 53—54—55 are the carriage members 59—60—61 carrying light bulbs 62—63—64, respectively. Attached to carriage members 59, 60 and 61 are strings 65, 66 and 67, respectively. Strings 65 and 66 pass through holes in the sides, 47, and are wound around the spindle of the precision approach radar motor, 70. String 67 is wound around the spindle of airport surveillance radar motor, 71.

The details of carriage 61, are shown in Figure 4. Carriage 61 consists of a block 72, which may be of wood, and a track guide 73, preferably of thin metal, which is U shaped and passes around the two sides and bottom of the block 72, holding the block 72 in position on the track 55. The guide 73 may be attached to the sides of the block 72, as by screws. One end of block 72, has a hook 74 therein, to which string 67 is attached. The carriages 59 and 60 may be of identical construction with that of carriage 61.

Motor 70 is mounted on the left side wall 47, on the outside thereof, at a point approximately midway between the positions of the brackets 50 and 51. Motor 71 is mounted on the inside of backwall 45, close to the bracket 52. Motors 70 and 71 may be electric clock motors. The spindles about which the string 65, 66 and 67, are wound may be selected for size to give the desired speed of the carriages along the track members.

As shown in Figure 5, a source 80 of alternating current is provided which will usually be about 110 volts. This source 80 is connected through main switch 81 to all of the electrical components of the radar trainer. Operating voltage is provided through the switch 82, to the motor 70, and through the switch 83 to motor 71. The source 80, when switch 81 is closed, is also connected through a blinking device 86, and transformer 87 to the target lamps 62, 63 and 64, which are connected in parallel. The transformer 87 serves to step down the voltage applied to the target lights 62, 63 and 64, so that when energized, these lights will have a dully glowing filament. The blinking device 86 may be a switch having a bimetallic member which, when heated, would bend and break the contact. On cooling the bimetallic member will straighten and again make the contact. This make-and-break action continues as long as current goes through the bimetallic member. Switch 81 is also connected through the rheostat 88 to the six map lights 39 which are connected in series to minimize the number of wires required inside of the frame 43.

In the use of the above-described radar trainer, the main switch 81 is turned to its "on" position and time is allowed for the blinking device 86 to warm up so that the target lights 62, 63 and 64 flash at normal intervals. Target lights 62, 63 and 64 provide the indication on the simulated scopes 11 and 17—18 of the target aircraft that is being brought into a landing at the airport. The flashing of these lamps simulates the intermittent scanning of the target indication on an actual radar scope. Since lamps 62, 63 and 64 are operated at less than their rated voltage, their filaments glow dully, and seen through the translucent green plastic plate appear to be a target indication as would appear on an actual radar scope. To further carry out actual target appearance, the target lamps 62, 63 and 64 are arranged in their lamp sockets on carriages 59, 60 and 61 with the filaments at right angles to the track members 53, 54 and 55.

The carriages 59, 60 and 61 are initially placed near the extreme ends of their tracks. Switch 83 is thrown to its "on" position by the instructor to start motor 71 and the target lamp 64 begins to slowly move along its track 55 in the general direction of the airport indication 15 on the airport surveillance scope simulation 11. The path of the incoming aircraft, represented by the target lamp 64 is adjusted by the instructor through the control rod 58.

The student controller simulates talking into a radio microphone, as would normally be done in actual practice and first establishes radar contact and then goes through the standard radar control procedures, giving current weather, radio check, etc., and verbally vectors the target onto the final approach course by giving proper turns and compass headings. The instructor directs the course of the target lamp 64 by means of the lever 58, as indicated by instructions given by the student controller. If the controller's instructions are not accurate or complete, the instructor will direct the target course accordingly.

When the aircraft, as indicated by the target lamp 64 has approached sufficiently near to the airport so that it should appear on the precision approach radar scope, the instructor places switch 82 in its "on" position to start motor 70, which begins to slowly pull carriages 59 and 60 along their respective tracks 53 and 54. The target lamps 62 and 63 then cause glowing indications to slowly move along the elevation screen 17 and the azimuth screen 18, and the student controller tells the imaginary approaching aircraft to fly up or down, right or left, until the filament of lamp 62 is proceeding directly down the line 20, and the indication of lamp 63 is proceeding along line 28. The instructor manipulates the control rods 56 and 57 in accordance with the student controller's direction.

The unit can be used to simulate a plan position indication, precision approach, or an instrument-landing-system monitored approach. For example, on a precision approach, the target can be sighted on surveillance and vectored into a position to start final approach and the controller can continue this simulated approach making the changeover from surveillance to precision and keep the target in contact, constantly giving instructions right on to the point of touchdown on the landing strip. If the target goes beyond the safe limits set for that particular airport, a simulated missed approach can be executed and the controller can go back to the surveillance scope and see the missed approach move away from the airport and start a right or left turn toward a missed approach holding pattern.

The carriages 59, 60 and 61 are moved back to their start position manually by unwinding the strings 65, 66 and 67 from the spindles of the motors 70 and 71. (It will be obvious that the spindles could be connected to the motors 70 and 71 through one-way clutches to simplify this operation.) It has been found advantageous to select the diameter of the spindle of motors 70 and 71 that will provide for a speed of 140 miles an hour on the precision scope and 230 miles an hour on the surveillance scope. These speeds were found to be the most practical for training purposes. The speeds can be varied by changing the size of the spindles. With these speeds, a complete run from twenty miles out on surveillance to touchdown on precision requires approximately seven minutes.

The rheostat 88 connected in the map light circuit, is controlled by the knob 68 on the front 44 of the frame 43. The rheostat 88 controls the brilliance of the map lights and the student controller is taught to use knob 68, which would regulate the radar gain control for reducing the brilliance of ground clutter when a target is passing through these bright spots on the scope. A room in which the shades are drawn has been found to provide sufficient darkness to see the targets and scope markings.

It will be seen that applicant has provided a radar training unit which is simple in construction, light in weight, portable, easy to operate and does not require the use of actual radar equipment or the use of an actual aircraft.

It will further be understood that the embodiment of this invention described in detail above is exemplary only, and many modifications will occur to those skilled in the art within the scope of the appended claims.

What is claimed is:

1. In a radar training unit, a flat translucent member bearing indicia thereon representing a navigational course to a preselected point, said member supported by a walled enclosure having at least one aperture, at least one track under said member, said track being pivoted at one end thereof at a fixed position approximately under said point, manually operable rod means slidable in said aperture and affixed to the other end of said track for selectively adjusting the angular position of said track about said pivot, a carriage movable along said track, a light source fixed to said carriage and motor means positioned adjacent said pivoted end of said track and coupled to said carriage for drawing said carriage along said track at a predetermined speed.

2. In a radar training unit, a flat translucent simulation of the screen of a plan position indicator, a flat translucent simulation of the screen of a precision approach elevation indicator and a flat translucent simulation of the screen of a precision approach azimuth indicator, a track under each of said simulations, each track being pivoted at one end thereof, manually operable means affixed to the other end of each of said tracks for selectively adjusting the angular position of each of said tracks about said pivots, a carriage movable along each of said tracks, a light source fixed to each of said carriages, a first motor means coupled to the carriage on the track under said plan position indicator simulation for moving said carriage along said track at a predetermined speed, and a second motor means coupled to said other two carriages for moving them along their tracks at a predetermined speed.

References Cited in the file of this patent

UNITED STATES PATENTS

| | | |
|---|---|---|
| 2,171,561 | Hooven | Sept. 5, 1939 |
| 2,389,359 | Grow | Nov. 20, 1945 |
| 2,491,308 | Gorton et al. | Dec. 13, 1949 |
| 2,514,392 | Heerdink | July 11, 1950 |